Dec. 7, 1926.
J. H. MacMAHON
1,609,756
APPARATUS FOR THE EVAPORATION OF LIQUID CHLORINE
Filed Nov. 8, 1924
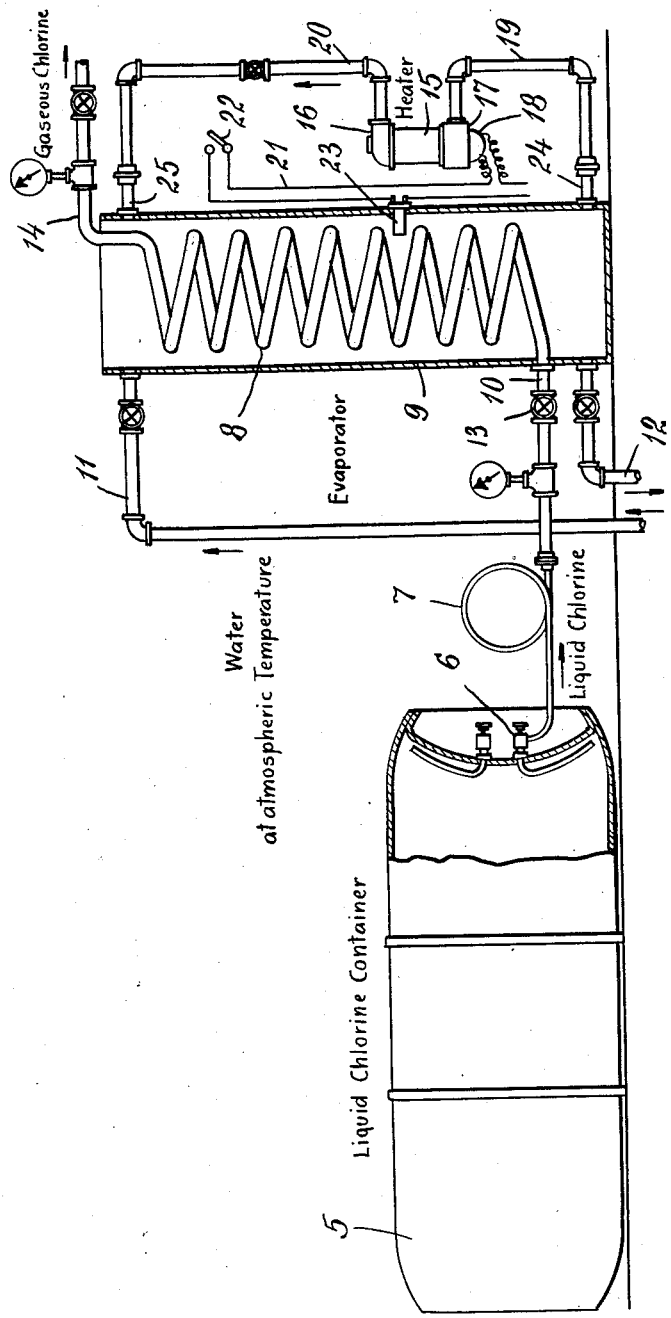
INVENTOR
James H. MacMahon
BY
Pennie, Davis, Marvin & Edmonds
ATTORNEYS Patented Dec. 7, 1926.

1,609,756

UNITED STATES PATENT OFFICE.

JAMES H. MacMAHON, OF NIAGARA FALLS, NEW YORK, ASSIGNOR TO THE MATHIESON ALKALI WORKS, INC., OF NEW YORK, N. Y., A CORPORATION OF VIRGINIA.

APPARATUS FOR THE EVAPORATION OF LIQUID CHLORINE.

Application filed November 8, 1924. Serial No. 748,611.

This invention relates to the evaporation of liquid chlorine, and includes improvements in apparatus particularly adapted for evaporating chlorine.

Chlorine is commonly supplied to the consumer in the form of a liquid in heavy containers under pressure. For use in chlorinating solutions, it is desirable to liberate the chlorine into the solution in the form of a gas in order to insure intimate contacting of the gas and of the solution as otherwise the vaporization of chlorine within the body of solution being chlorinated would yield such large gas bubbles that the absorption efficiency would be decreased and there would be danger of the escape of unabsorbed chlorine. The vaporization of liquid chlorine within the solution also has a cooling effect that is frequently undesirable. Likewise, in other applications, it is frequently desirable to have the chlorine in the form of a gas rather than a liquid. Chlorine has a low boiling point, about —53.6° C. at 760 mm., and a rather high heat of vaporization, about 67 calories per gram. It is necessary to supply heat to liquid chlorine in order to evaporate it at such rates as are necessary for practical purposes. It has been found that water at atmospheric temperature may be employed to effect the vaporization of the chlorine, but with relatively cold water at or near the freezing point it becomes necessary to employ large volumes of water to prevent the formation of ice. The formation of ice upon heat transferring surfaces interferes with the heat transfer and also decreases and renders irregular the operation of the evaporating apparatus.

According to the present invention, water from a source at atmospheric temperature is employed to effect the evaporation of the liquid chlorine and supplemental heat is supplied to the evaporating operation in amount sufficient to prevent freezing of the water. The liquid chlorine is evaporated by being brought in heat exchanging relation with water from a source at atmospheric temperature, and sufficient additional heat is supplied to the water employed for effecting the evaporation to maintain the temperature of the water above the freezing point. Some heat in excess of that required to prevent actual freezing may be supplied, but advantageously the amount of additional heat used is restricted to an amount just sufficient to provide a small margin to prevent freezing. Usually, the amount of additional heat employed is very materially less than that required to effect the vaporization of the liquid chlorine. The main supply of heat for the evaporation is thus derived from the water and only a minimum amount of additional heat is required while at the same time temperatures tending to cause dangerous pressures are avoided. Relatively cold water at or near the freezing point may thus be employed without disadvantage due to freezing.

In carrying out the invention, the chlorine may be evaporated, for example, in an evaporating receptacle, such as a coil of pipe, immersed in a tank or disposed within a jacket through which water from a source at atmospheric temperature flows, which tank or jacket may be either open or closed. After being used in the evaporation, the water may be run to waste or it may be otherwise disposed of. The liquid chlorine is withdrawn from a supply under pressure and introduced into the evaporating receptacle at a reduced pressure. The supplemental heat employed in the evaporation may be supplied in different ways. A part of the water in the evaporator may be circulated from the evaporator through a heater and back to the evaporator.

The supply of additional heat to the evaporation is advantageously regulated by automatic means such as a thermostat or the like. A thermostat may be arranged so that whenever the temperature of the water in the evaporator, or escaping from the evaporator, falls to a predetermined point somewhat above the freezing temperature heat is supplied to prevent the water reaching the freezing temperature. The predetermined temperature at which the thermostat is adjusted to operate will depend upon the amount of water employed to effect the evaporation as well as the capacity of the heating apparatus, and sufficient margin should be provided, with allowance for the capacity of the supplementary heating means, to prevent any part of water in the evaporator reaching the freezing temperature. The thermostat may also be regulated to prevent heating of the water to a point where dangerous pressures may develop in the evaporator, for example to limit the pressures therein not to exceed 2 atmospheres, but the safe limit of pressures will vary with different apparatus. Due to the relatively low temperatures employed, there is substantially no danger because of the possible development of excessive pressures. The thermostat may be disposed within the tank or jacket and is advantageously located adjacent the point at which the evaporating water leaves the evaporator.

A variety of heating means may be employed. A heater may be arranged externally to the tank or jacket and heated with steam or combustion gases or electrically. Where an external heater is employed, the supply of supplemental heat may also be regulated by controlling the circulation through an external heater. It is particularly advantageous to employ electrical energy to supply the heat used in carrying out the present invention, especially where automatic regulation of the supply of additional heat is employed. Since the greater part of the heat required for evaporation is supplied by the water, only relatively small amounts of additional heat are necessary and electrical energy can be employed economically while all of its advantages may be enjoyed.

The accompanying drawing, which is a diagrammatic and partly sectional view in elevation of a chlorine evaporator according to the present invention connected to a typical source of liquid chlorine, illustrates apparatus embodying the invention and particularly adapted for practicing the process of the invention. It will be understood, however, that the invention is illustrated thereby and not limited thereto.

The drum 5 represents a typical container in which liquid chlorine is supplied to the consumer, and consists of a steel drum provided with a valved connection 6 for withdrawing liquid chlorine therefrom. Such containers may, for example, hold about one ton of liquid chlorine. The liquid chlorine escapes from the container through connection 7 to an expansion valve arranged in the inlet to the evaporating receptacle.

The evaporator illustrated in the drawing consists of a coil of pipe 8 disposed within a tank 9, the lower end of the pipe coil passing out through a tight joint 10 in the lower part of the tank and the upper end of the coil passing out through the open upper end of the tank. A connection 11 communicating with a supply of water at atmospheric temperature is arranged to discharge into the upper end of the tank and connection 12 is provided for discharging the water from the lower end of the tank. The connections to the evaporating pipe coil and the tank are advantageously arranged as shown so that the circulation of chlorine and evaporating water are generally countercurrent. The liquid chlorine is supplied to the evaporating coil through the expansion valve 13 and the chlorine gas is conducted from the vaporizing coil through connection 14. The heater illustrated is arranged externally of the tank and consists of a shell 15 provided with an upper cover 16 and a T 17, and an electrical resistance heating element disposed within the shell 15 and supported from the lower cover 18. A connecting pipe 19 is provided entering the lower part of the heater and a discharge pipe 20 connects to the upper cover. Power to operate the heating element may be drawn from any source of electrical energy through connections 21 including switch 22. The thermostat 23 is also included in the electrical circuit and is arranged to control the supply of additional heat from the heater by opening and closing the electrical circuit as the temperature rises and falls respectively.

In the apparatus illustrated water at atmospheric temperature is introduced into the tank 9 through connection 11, is circulated through the tank in heat exchanging relation with the evaporating coil 8 and is discharged from the tank through outlet connection 12. This water may be at a temperature just above the freezing point. Another outlet 24 is arranged at the lower part of the tank and connecting piping is provided for circulating water therefrom through the heater and back to the tank to the inlet 25 arranged at the upper end of the tank. Circulation through the heater is maintained by thermosyphonic action. The thermostat 23 is adjusted so that the heater operates whenever the temperature in the tank falls below some predetermined temperature above freezing, for example, 33° or 34° F. Liquid chlorine is supplied to the coil 8 and is evaporated therein by heat exchange with the water from a source at atmospheric temperature, thereby cooling the water, but before the temperature of the water in the tank 9 reaches the freezing point additional heat is supplied by the heater as required to prevent freezing of the water in the tank. A large part of the heat required to evaporate the chlorine is thus supplied from the water and the heater is called upon to supply only the relatively small amount necessary to prevent freezing. The pressure within the evaporating coil may be atmospheric pressure or such pressure above atmospheric as is required to force the chlorine gas through connecting piping or through the apertures at the point of application of the chlorine gas.

One of the important advantages of the present invention is its simplicity. An important heat economy is also effected in employing water at atmospheric temperature to effect the vaporization. At the same time the danger incident to relatively high temperatures and the necessity for careful manipulation and control is avoided. Moreover the invention enables the utilization of water near the freezing temperature to supply the required heat. Difficulties due to freezing of the evaporating water employed, however, are avoided while at the same time the minimum of additional heat is necessary. Another important advantage of the apparatus of the present invention is the ease of regulation and the small amount of attention required.

The dimensions of the evaporating receptacle can be widely varied and depend principally upon the quantity of liquid chlorine to be vaporized and the desired rate of evaporation. By providing a larger area of heat transfer in the evaporating receptacle, water of lower temperature or a lesser amount of water may be employed to supply the necessary heat. In like manner, proportioning of the supplementary heater depends upon the amount and temperature of the water available as well as upon the amount of chlorine to be vaporized. The amount of heat supplied by the heater may be less where a greater amount of water or water of higher temperature is employed to effect the vaporization. The nearer the temperature of the evaporating water is to the freezing point, the greater will be the amount of heat supplied to the supplemental heater.

I claim:—

1. The combination in an apparatus for evaporating liquid chlorine, a supply of liquid chlorine under pressure and an evaporating receptacle connected thereto including an expansion valve, means for circulating water from a source at atmospheric temperature in heat exchanging relation with the receptacle, and heating means for raising the temperature of the water when the temperature thereof has been reduced below atmospheric temperature by contact with the evaporating receptacle.

2. The combination in an apparatus for evaporating liquid chlorine, a tank, a supply of liquid chlorine under pressure, an evaporating receptacle within said tank, connections between the supply of liquid chlorine and the evaporating receptacle including an expansion valve, means for circulating water from a source at atmospheric temperature in heat interchanging relation with the evaporating receptacle, a heater exterior of said tank, means for conveying water between the tank and the heater, and means for causing the heater to raise the temperature of the water when the temperature thereof has been reduced below the atmospheric temperature by contact with the evaporating receptacle.

In testimony whereof I affix my signature.

JAMES H. MacMAHON.